(12) United States Patent
Klemm et al.

(10) Patent No.: US 9,008,689 B2
(45) Date of Patent: Apr. 14, 2015

(54) DYNAMIC GUIDANCE TO A TARGET CONVERSATION AREA WITH A COMMUNICATION DEVICE

(71) Applicant: Avaya Inc., Basking Ridge, NJ (US)

(72) Inventors: Reinhard Klemm, Basking Ridge, NJ (US); Parameshwaran Krishnan, Basking Ridge, NJ (US); Doree D. Seligmann, New York, NY (US); Navjot Singh, Denville, NJ (US)

(73) Assignee: Avaya, Inc., Basking Ridge, NJ (US)

( * ) Notice: Subject to any disclaimer, the term of this patent is extended or adjusted under 35 U.S.C. 154(b) by 60 days.

(21) Appl. No.: 13/861,485

(22) Filed: Apr. 12, 2013

(65) Prior Publication Data

US 2014/0308970 A1    Oct. 16, 2014

(51) Int. Cl.
*H04W 4/02* (2009.01)
(52) U.S. Cl.
CPC ...................................... *H04W 4/02* (2013.01)

(58) Field of Classification Search
CPC ... H04W 84/105; H04W 84/16; H04W 88/06; H04W 88/10
USPC .............. 455/432.1, 435.1, 456.1, 456.3, 462
See application file for complete search history.

(56) References Cited

U.S. PATENT DOCUMENTS

2003/0123626 A1*   7/2003   Beckmann et al. ........ 379/93.35

* cited by examiner

*Primary Examiner* — Sam Bhattacharya (57) ABSTRACT

Embodiments disclosed herein provide systems and methods for dynamically guiding a user to a target conversation area with a communication device. In a particular embodiment, a method provides receiving a call request to establish a call with a communication device and determining a location of the communication device. The method further provides determining a target conversation area for a user of the communication device to participate in the call based on the location of the communication device. The method also provides directing the user to the target conversation area.

20 Claims, 6 Drawing Sheets

DYNAMIC GUIDANCE TO A TARGET CONVERSATION AREA WITH A COMMUNICATION DEVICE

TECHNICAL BACKGROUND

A wireless communication device can be used anywhere that is served by some type of wireless communication network. In order to maximize the quality of wireless service provided to the wireless device, a user may attempt to find a location having a good wireless signal quality. A user of the wireless device may know where such locations exist or may reference other sources for information about locations with good or bad signal quality. For example, websites exist that maintain information sourced from many users about the signal quality at various locations.

Even if the user is able to find a location with good signal quality, the nature of wireless devices means that a wireless device's current location may not be best suited for other aspects of operation. For example, a location may have good signal quality but is loud and, therefore, not conducive to a private telephone conversation. Moreover, a database of signal strengths will cover a broad location but not individual rooms of a building or other structure. Therefore, the user of the wireless device may be unable to find a location that is best suited to their needs at any given time.

Overview

Embodiments disclosed herein provide systems and methods for dynamically guiding a user to a target conversation area with a communication device. In a particular embodiment, a method provides receiving a call request to establish a call with a communication device and determining a location of the communication device. The method further provides determining a target conversation area for a user of the communication device to participate in the call based on the location of the communication device. The method also provides directing the user to the target conversation area.

In some embodiments, the method further provides determining parameters for the call, wherein determining the target conversation area is further based on the parameters for the call.

In some embodiments, the method further provides that determining the target conversation area comprises comparing the parameters for the call and the location of the communication device with characteristics for each target conversation area of a plurality of target conversation areas to determine a compliance of each target conversation area to the parameters for the call and the location of the communication device. The method further provides ranking each target conversation area of the plurality of target conversation areas from most compliant with the parameters and the location for the call to least compliant and selecting the target conversation area based on the ranking for each target conversation area of the plurality of target conversation areas.

In some embodiments, the method further provides that selecting the target conversation area based on the ranking comprises selecting the target conversation area with the most compliant ranking.

In some embodiments, the method further provides that selecting the target conversation area based on the ranking comprises, in the communication device, presenting the user with one or more of the target conversation areas with the most compliant rankings and receiving a selection from the user indicating the target conversation area from the one or more of the target conversation areas with the most compliant rankings.

In some embodiments, the method further provides receiving at least a portion of the parameters for the call from the user.

In some embodiments, the method further provides, upon determining that the user has reached the target conversation area, updating characteristics for the target conversation area to indicate that the user is occupying the target conversation area for the call.

In some embodiments, the method further provides, upon completion of the call, updating the characteristics for the target conversation area to indicate that the user is not occupying the target conversation area for the call.

In some embodiments, the method further provides that directing the user to the target conversation area occurs in response to an indication from the user that the user wants to be directed to the target conversation area.

In some embodiments, the method further provides placing the call on hold while the user is directed to the target conversation area and notifying other users on the call that the user is being directed to the target conversation area.

In another embodiment, a communication system is provided. The communication system includes a communication device configured to receive a call request to establish a call with the communication device, determine a location of the communication device, and direct the user to a target conversation area for a user of the communication device to participate in the call. The communication system further includes a target conversation area system configured to determine the target conversation area based on the location of the communication device.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
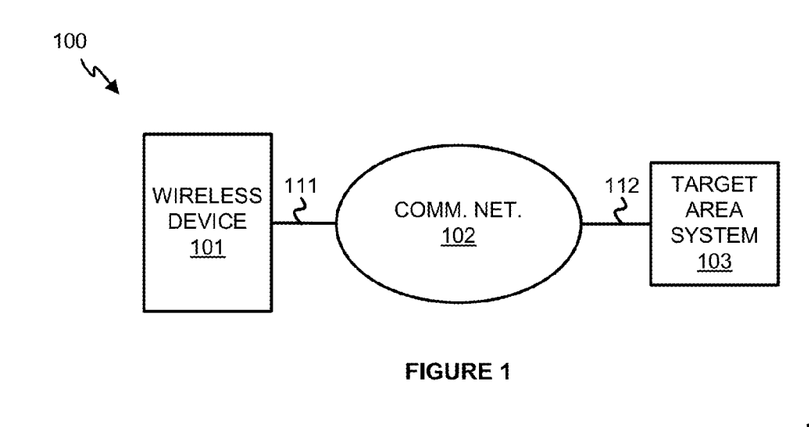
FIG. 1 illustrates a wireless communication system for dynamically guiding a user to a target conversation area with a wireless communication device.

FIG. 1 illustrates wireless communication system 100. Wireless communication system 100 includes wireless communication device 101, communication network 102, and target conversation area system 103. Wireless communication device 101 and communication network 102 communicate over wireless link 111. Communication network 102 and target conversation area system 103 communicate over communication link 112.

In operation, a user of wireless device 101 may operate the device to initiate outgoing or receive incoming calls. The calls may include audio calls, video calls, and the like, those calls may use any communication protocol and communication network type that may be supported by a wireless device, and may be connected between two or more parties to the call. When on a call, the user of wireless device 101 may want to find an acceptable area where the user can participate in the call with low background noise, increased privacy, good wireless signal strength, or any other preference that a user may have for a location in which to participate in a call.

While the user may know of acceptable conversation areas at locations familiar to the user, the user may not know of acceptable conversation areas at locations that are unfamiliar to the user. Moreover, even if the user is at a known location, the user may not know the current status of an acceptable conversation area. Thus, the user may go to the acceptable conversation area only to find that the conversation area does not currently comply with the conditions that made the conversation area acceptable to the user. In both of the above examples, the user may have to delay the call while the user searches to find an acceptable conversation area.

Figure 2:
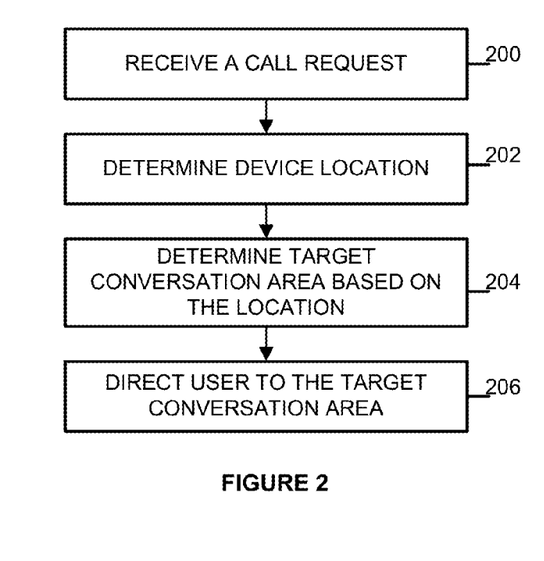
FIG. 2 illustrates an operation of the wireless communication system for dynamically guiding a user to a target conversation area with a wireless communication device.

FIG. 2 illustrates an operation of wireless communication system 100 to dynamically guide a user to a target conversation area with a wireless communication device. A call request is received to establish a call with wireless device 101 (step 200). The call may be an audio call, a video call, a data call, or some other type of synchronous communication modality. The call may be a call that is placed using any communication protocol that can be supported by a wireless device, such as Voice over Internet Protocol (VoIP), Session Initiation Protocol (SIP), or a cellular voice protocol. The call may be placed over any type of communication network that can be supported by a wireless device, such as WIFI, Long Term Evolution (LTE), Code Division Multiple Access (CDMA), and Global System for Mobile (GSM).

The call request may be received as user input from a user of wireless device 101 instructing wireless device 101 to initiate a call with one or more other parties. For example, the user may enter one or more phone numbers, enter one or more usernames, select one or more contacts from an electronic address book, or any other means by which a user can identify called parties in a wireless device—including combinations thereof. Alternatively, the call request may be an incoming call request, as is the case if another party is attempting to contact wireless device 101. An incoming call request may be received over the same communication network that wireless device 101 uses to communicate with target conversation area system 103 (i.e. communication network 102) or over some other communication network with which wireless device 101 exchanges communications.

A location of wireless device 101 is determined (step 202). The location may be determined based upon Global Positioning Coordinates (GPS) received from a GPS module in wireless device 101, locations of access nodes of communication network 102 and/or other communication networks to which wireless device 101 is connected, location identifiers in near field communications (NFC) elements, such as RFID tags, read by wireless device 101 at the location, user input received from the user of wireless device 101, or any other means by which a wireless device location may be determined—including combinations thereof. The location may be determined by wireless device 101 or by target conversation area system 103.

A target conversation area for the user of wireless device 101 to participate in the call is determined based on the location of wireless device 101 (step 204). The target conversation area is determined by target conversation area system 103 using information about possible target conversation areas stored in target conversation area system 103. Target conversation area system 103 includes information about target conversation areas for one or more places. A place may be a building, a floor of a building, or some other portion of a building or structure, a park, portion of a park, or other outdoor space, a building complex, or any other way of designating a place. The location of the wireless device 101 indicates a place or where within a place wireless device 101 is located. The information for each target conversation area may be provided to target conversation area system 103 by a system administrator at the time system 103 is implemented in a place. For example, the system administrator may program information for target conversation areas within a building based on knowledge that the system administrator has about the building, such as areas of the building that the system administrator currently perceives to be potential target conversation areas. The information may be updated, added to, or subtracted from as the administrator sees fit.

The information about the target conversation areas indicates locations of the target conversations areas within the respective places. Accordingly, the location of wireless device 101 indicates a location within a place and the target conversation area is selected from the target conversation areas in that place. In particular, the target conversation area may be selected based on the proximity of the target conversation area to the location of wireless device 101. For example the target conversation area, may be the closest target conversation area to the location of wireless device 101 either by distance or time for the user of wireless device 101 to reach the target conversation area.

After target conversation area system 103 determines the target conversation area, wireless device 101 directs the user to the target conversation area (step 206). The directions may be presented visually on a screen of wireless device 101 and/or audibly through a speaker or earpiece of wireless device 101. In some embodiments, the directions may be a list of steps to reach the target conversation area from the location of wireless device 101, turn-by-turn navigation type directions that direct the user to the target conversation area, a map indicating the target conversation area, or some other means of indicating where the target conversation area is located in the place. In some embodiments, the directions may present an indicator for the target conversation area. For example, if wireless device 101 is located in an office building, then the directions may indicate a room number where the target conversation area is located and the user will find his or her own way to the room corresponding to the room number.

In some embodiments, the user may accept the call request and be directed to the target conversation area while participating in the call. In these embodiments, wireless device 101 may "whisper" to the user through a speaker or earpiece being used for the call so that the user can receive the directions while participating in the call. In other embodiments, the user may place the call on hold or the call may be placed on hold automatically while the user is directed to a target conversation area. Similarly, some embodiments may estimate a time needed to reach the target conversation area and provide the estimated time to the user of wireless device 101. Furthermore, other embodiments may provide the user with the option to disconnect the call if that time exceeds a threshold amount of time. The call may then be automatically reconnected upon the arrival of wireless device 101 at the target conversation area.

In some embodiments, at least a portion of the functionality of target conversation area system 103 may be performed in wireless device 101. For example, target conversation area system 103 may only act as a database of target conversation area information and wireless device 101 may perform the steps of FIG. 2 by referencing the information in target conversation area system 103.

The functionality discussed above for wireless device 101 may be performed in response to the execution of instructions by wireless device 101. The instructions may take the form of an application downloaded from an online application store or otherwise installed on wireless device 101, may be built into an operating system or firmware for wireless device 101, or any other way of providing wireless device 101 with software instructions.

In some embodiments, wireless device 101 will automatically initiate the steps to determine a target conversation area upon receiving the call request and in other embodiments wireless device 101 will initiate the steps to determine a target conversation area at the request of the user. The user request may be received in response to a prompt by wireless device 101 asking the user if the user would like to be directed to a target conversation area. Alternatively, the user request may be received by wireless device 101 without prompting the user. For example, upon being notified of the call request, the user may open up a target conversation area app on wireless device 101.

While shown as a sequence, the steps of FIG. 2 do not necessarily occur in the order described. For example, one or both steps of determining the location of wireless device 101 and determining the target conversation area based on the location could occur before receiving the call request. For example, wireless device 101 may periodically determine its location and may also determine a target conversation area for that location in anticipation of a call request being received. Accordingly, upon receiving the call request wireless device 101 the location and the target conversation area have already been determined, which may allow wireless device 101 to begin directing the user to the target conversation area more quickly upon receiving the call request.

In some embodiments, wireless device 101 may instead be a wired communication device, such as a desktop computer, laptop computer, IP telephone, or any other type of communication device capable of wired communications. As in the case of a wireless communication device, the location of the wired communication device may not be ideal for the received call. Therefore, a target conversation area is determined in the manner described above and the wired communication device directs the user to a target conversation area. Since the wired communication device may not be mobile like a wireless communication device, the call may be transferred to a communication device at the target conversation area or the user may reconnect the call using the communication device at the target conversation area upon reaching the target conversation area. Alternatively, the wired communication device may instruct a wireless communication device to direct the user to the target conversation area where the user may use the wireless communication device for the call or use a communication device located at the target conversation area.

In further embodiments, multiple target conversation areas may be determined and the user of wireless device 101 may be prompted with an option to select one of the multiple target conversation areas. Upon receiving a selection of one of the target conversation areas, wireless device 101 directs the user to the selected area. Similarly, if the user is directed to the target conversation area and the user does not find the target conversation area suitable for the call, the user may request to be directed to another target conversation area based on the current location of wireless device 101.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, tablet, e-book, mobile Internet appliance, wireless network interface card, media player, game console, or some other wireless communication apparatus—including combinations thereof.

Communication network 102 comprises network elements that provide communications services to wireless device 101. Communication network 102 may comprise switches, wireless access nodes, Internet routers, network gateways, application servers, computer systems, communication links, or some other type of communication equipment—including combinations thereof.

Target conversation area system 103 comprises a computer system and communication interface. Target conversation area system 103 may also include other components such a router, server, data storage system, and power supply. Target conversation area system 103 may reside in a single device or may be distributed across multiple devices. Target conversation area system 103 is shown externally to communication network 102, but system 103 could be integrated within the components of communication network 102.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
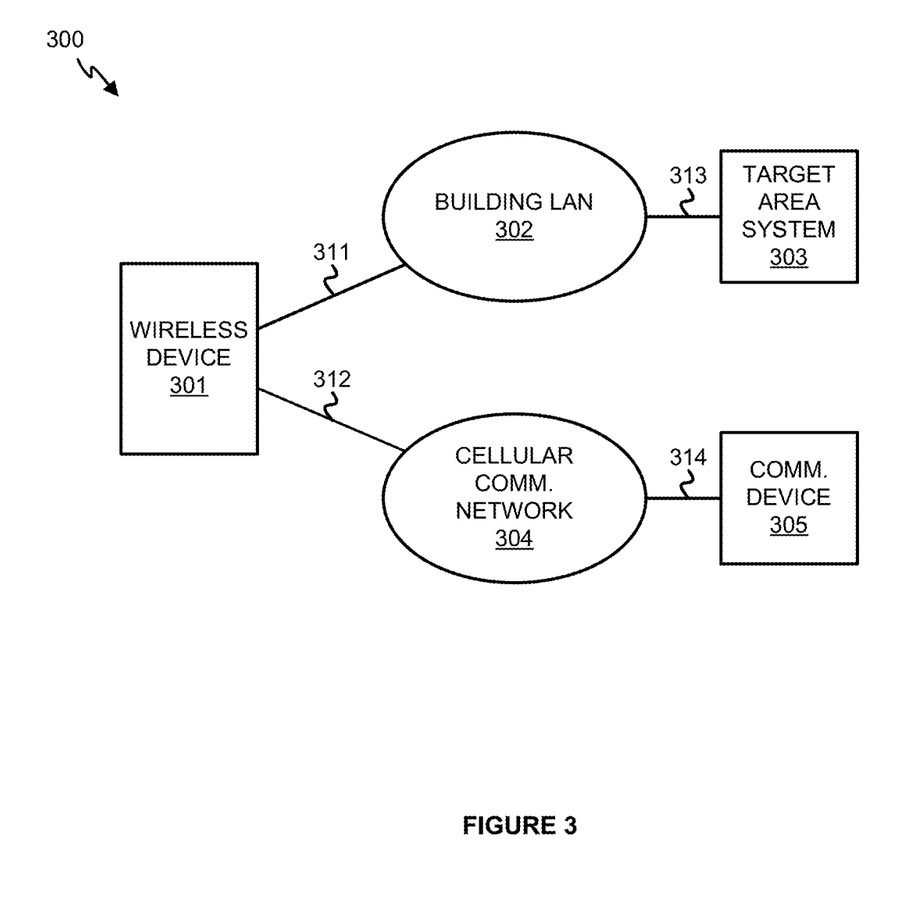
FIG. 3 illustrates a wireless communication system for dynamically guiding a user to a target conversation area with a wireless communication device.

FIG. 3 illustrates wireless communication system 300. Wireless communication system 300 includes wireless communication device 301, building local area network (LAN) 302, target conversation area system 303, cellular communication network 304, and communication device 305. Wireless communication device 301 and communication network 302 communicate over wireless link 311. Wireless communication device 301 and cellular communication network 304 communicate over wireless link 312. Building LAN 302 and target conversation area system 303 communicate over communication link 313. Cellular communication network 304 and communication device 305 communication over communication link 314.

In operation, wireless device 301 is a multimode device that is configured to exchange communications over multiple types of wireless communication networks. In this embodiment, wireless device 301 is configured to access building LAN 302 via WIFI access points located within an office building and configured to access base stations of cellular network 304 via base stations of cellular network 304. Wireless device 301 can therefore exchange communications with other systems and devices over building LAN 302 and cellular network 304. Communication device 305 may be configured to communicate with cellular network 304 but may also communicate with cellular network 304 through the use of other communication networks, such as a public switched telephone network and/or the Internet.

Similarly, while target conversation area system 303 is shown as directly connected to building LAN 302, target conversation area system 303 may be connected to building LAN 302 via the Internet or other communication networks. Accordingly, wireless device 301 may be able to target conversation area system 303 via cellular network 304 as well. Target conversation area system 303 may be a target conversation area system for the single building where building LAN 302 is located or may be a system for multiple places where wireless device 301 or other wireless devices may be located.

Figure 4:
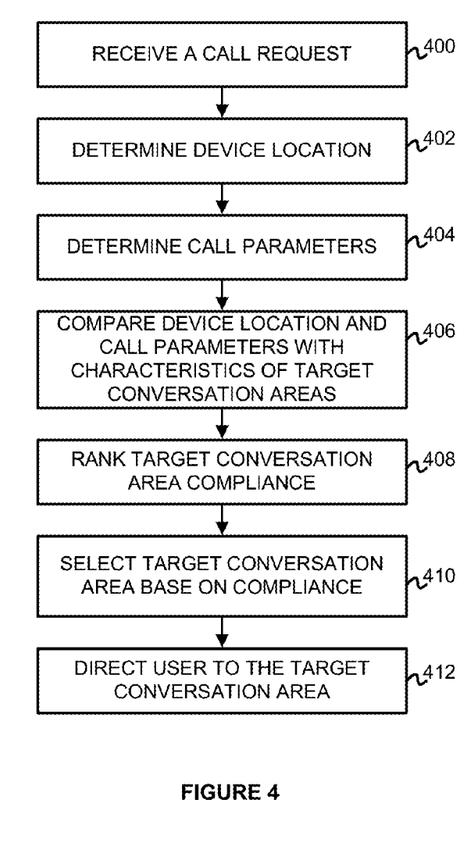
FIG. 4 illustrates an operation of the wireless communication system for dynamically guiding a user to a target conversation area with a wireless communication device.

FIG. 4 illustrates the operation of wireless communication system 300 to dynamically guide a user to a target conversation area with a wireless communication device. Wireless device 301 receives a call request to establish a call with communication device 305 over cellular network 304 (step 400). The call request may be received as an instruction from a user of wireless device 301 for the call to be placed to communication device 305, such as a user indication of a phone number for communication device 305. Alternatively, the call request may be received from cellular network 304 in response to communication device 305 attempting to call wireless device 301.

The location of wireless device 301 is determined in order to select a target conversation area where the user can participate in the call (Step 402). In this embodiment, target conversation area system 303 is notified by wireless device 301 that a target conversation area is requested. Target conversation area system 303 then determines the location of wireless device 301 based on the location of an access node of building LAN 302 with which wireless device 301 is communicating. For example, target conversation area system 303 may have a database of locations corresponding to the access nodes of business LAN 302 in an office building served by business LAN 302. Based on the location of the access node used by wireless device 301, target conversation area system 303 is able to infer the location of wireless device 301 within the office building. In some embodiments, target conversation area system 303 may be part of a building IT system that may also control HVAC, lighting, security, or any other features of an office building that may be controlled by a computer system.

Target conversation area system 303 also determines call parameters for the call (step 404). Portions of the call parameters may be received with the notification from wireless device 301 requesting the target conversation area, may be received from wireless device 301 in a separate message sent as some other time, may be received by target conversation area system 303 from a system administrator, or any other means by which parameters can be received by a computing system. A user of wireless device 301 may enter at least a portion of the call parameters into wireless device 301 for transmission to target conversation area system 303.

The parameters for the call may include parameters for the specific call, parameters for all calls on wireless device 101, parameters for calls of a particular call type (i.e. voice, video, protocol type, etc.), or any other type of parameter—including combinations thereof. Exemplary call parameters may indicate a privacy level desired for the call, the type of call, accessibility requirements for the target conversation area (e.g. certain obstacles, like stairs or restricted doorways, should be avoided on the route from the location of device 101 to the target conversation area), expected duration of the call (e.g. closer conversation areas may be preferred for shorter calls), a language in which the call will be conducted (i.e. privacy may still be achieved if the language is foreign to others in the conversation area), personal preferences for a conversation area (e.g. to accommodate for the user's fear of heights, claustrophobia, etc.), or any other parameter that may effect the selection of one target conversation area over another—including combinations thereof. The call parameters are transferred to target conversation area system 103 before target conversation area system 103 so that target conversation area system 103 can determine the target conversation area based on the parameters.

Once the parameters for the call are determined, the parameters for the call and the location of wireless device 301 are compared to characteristics of target conversation areas (step 406). Characteristics for each of the target conversation areas are stored in target area system 103 and include a location of each target conversation area include along with any characteristic for a target conversation area that may apply to the call parameters received from wireless device 101. For example, the characteristics for each target conversation area may include a privacy level for each target conversation area so that target conversation area system 103 can compare a privacy level indicated by the call parameters to the privacy level of the target conversation areas. A target conversation area that has a privacy level at least that of the privacy parameter will be considered as compliant with the parameter.

The characteristics may be static and/or dynamic. Static characteristics are characteristics for a conversation area that are not changed in the system, such as characteristics that are preprogrammed into target conversation area system 103 for the target conversation areas at a place. Dynamic characteristics may change over time and may be received from other systems and devices. For example, one or more of the target conversation areas in a place may include equipment, such as sensors, cameras, etc., that sends information to target conversation area system 103 about the characteristics of the respective target conversation areas. This information may be sent periodically, continually, or upon a change in one or more characteristics. For example, the dynamic characteristics may include a noise level of the area, a number of people in the area, a lighting level of the area, or any other type of information that may change over time. Other dynamic characteristics may be inferred by target conversation area system 103. For example, if a target conversation area is a room located on the west side of a building, then that target conversation area may not be good for video calls in the late afternoon due to glare that may be caused by sunlight coming in through windows of the room.

Based on the comparison, target conversation area system 303 ranks the target conversation areas based on the each target conversation area characteristics' compliance with the call parameters (step 408). The target conversation areas are ranked from most compliant to least compliant. Target conversation area system 303 may consider all target conversation areas when ranking the target conversation areas for compliance or may only consider a subset that is located within a threshold distance from wireless device 301. The distance can be a direct distance to each target conversation area, a walking distance or time (i.e. through hallways, up/down elevators, etc.), a number of floors, or any some other way of measuring distance between two locations. In order to rank compliance, some embodiments weigh various call parameters more highly than others. For example, an accessibility parameter may outweigh a noise level parameter thereby ranking a conversation area that complies with an accessibility parameter more highly than a conversation area that complies with a noise level parameter.

Target conversation area system 303 then selects a target conversation area based on the compliance rankings (step 410). In some embodiments, target conversation area 303 selects the highest ranking target conversation area, or one of the highest ranking target conversation areas if there is a tie, and transfers information about the selected target conversation area to wireless device 301. In other embodiments, target conversation area system 303 picks a number of the highest ranked target conversation areas and transfers information about each of the target conversation areas to wireless device 301 where the user of wireless device 301 selects a target conversation area from the number of target conversation areas.

Once the target conversation area has been selected, wireless device 301 directs the user to the target conversation area (step 412). At least a portion of the information needed to direct the user to the target conversation area may be included in the information transferred from target conversation area system 303 in step 410. However, in some embodiments, wireless device 301 may need only to receive the identity of the target conversation area and use information already stored thereon to direct the user to the target conversation area.

In some embodiments, upon reaching the target conversation area, wireless device 301 notifies target conversation area system 303 that wireless device 301 is being used for a call in the target conversation area. In response, target conversation area system 303 updates a privacy characteristic for the target conversation area to reflect that the target conversation area is in use. Accordingly, if another wireless device requires a target conversation area, target conversation area system 303 can factor in wireless device 301's use of the target conversation area when selecting an area for the other device. Upon completing the call, wireless device 301 transfers an indication that the target conversation area is not in use and target conversation area system 303 updates the privacy characteristic of the target conversation area to reflect the change.

In some embodiments, target conversation area system 303 may be used to find areas for other purposes. In those embodiments, rather than call preferences, the user may enter preferences for whatever is required of the desired area. For example, a user may want a safe place to wait for a bus, a place where other people can see the user, a place to leave a stroller, a place to get out of the elements, or any other type of preference. Target conversation area system 303 can perform steps 404-410 on the preferences in order to select an area that complies with the preferences and wireless device 301 can direct the user to that area accordingly.

Figure 5:
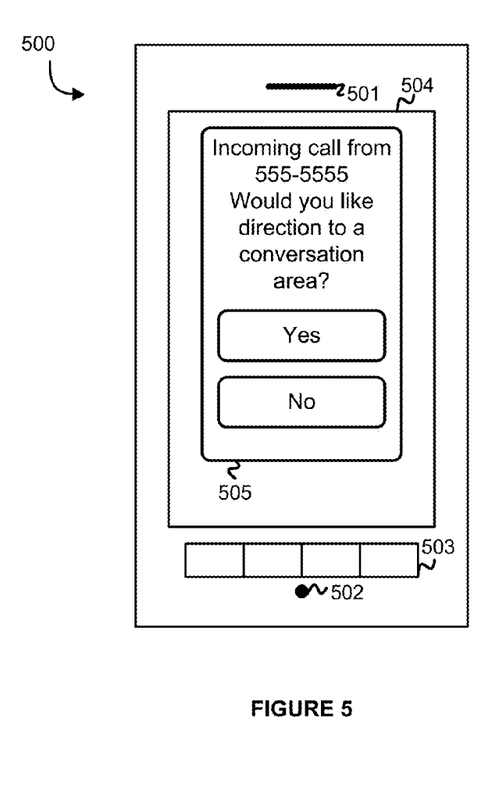
FIG. 5 illustrates a wireless communication device for dynamically guiding a user to a target conversation area with a wireless communication device.

FIG. 5 illustrates wireless communication device 500. Wireless communication device 500 includes speaker 501, microphone 502, buttons 503, and touchscreen display 504. Wireless device 500 is an example of wireless device 301, however wireless device 301 may use alternative configurations. In this embodiment, wireless device 500 receives an incoming call from communication device 305. In response to receiving the call request, display 504 presents option box 505. Option box 505 asks whether the user of wireless device 500 would like to be directed to a conversation area for the call. If the user selects yes, then the process described in FIG. 4 will be initiated in order to direct the user to a target conversation area for the call. While being directed to the target conversation area the incoming call may be placed on hold automatically, the user may begin the call/ask the caller to hold, or the call may be declined for the user to call communication device 305 upon reaching the target conversation area. If the user selects no, then the user can handle the call in an manner the user sees fit, such as answering the call, ignoring the call, sending the call to voicemail, etc.

A similar option box may also be displayed when the user of wireless device 500 places an outgoing call. That option box may be presented in response to the user indication that the user desires the outgoing call to be placed or the user may request a target conversation area before requesting the outgoing call.

Figure 6:
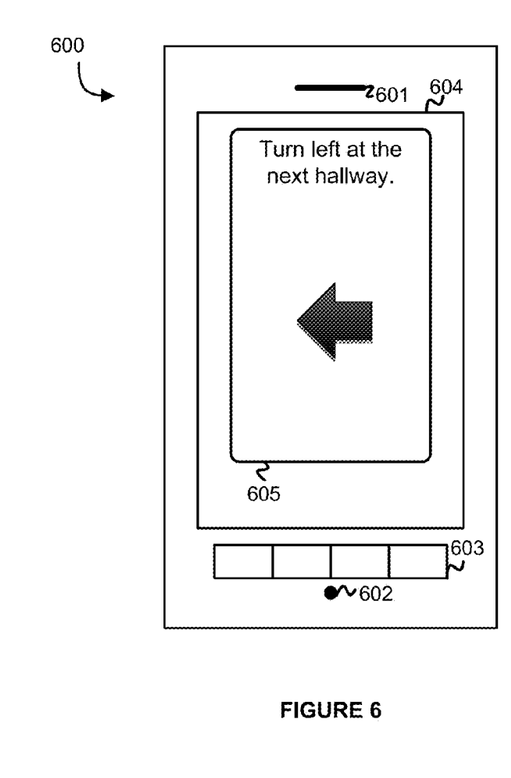
FIG. 6 illustrates a wireless communication device for dynamically guiding a user to a target conversation area with a wireless communication device.

FIG. 6 illustrates wireless communication device 600. Wireless communication device 600 includes speaker 601, microphone 602, buttons 603, and touchscreen display 604. Wireless device 600 may be an example of wireless device 500 after wireless device 500 has received a target conversation area from target conversation area system 303. In this embodiment, display 604 is presenting turn-by-turn direction information to a user of wireless device 600. Specifically, direction box 605 is instructing the user to turn left at the next hallway. When the user turns left at the next hallway, direction box 605 will change to display the next direction step needed for the user to reach the target conversation area.

Figure 7:
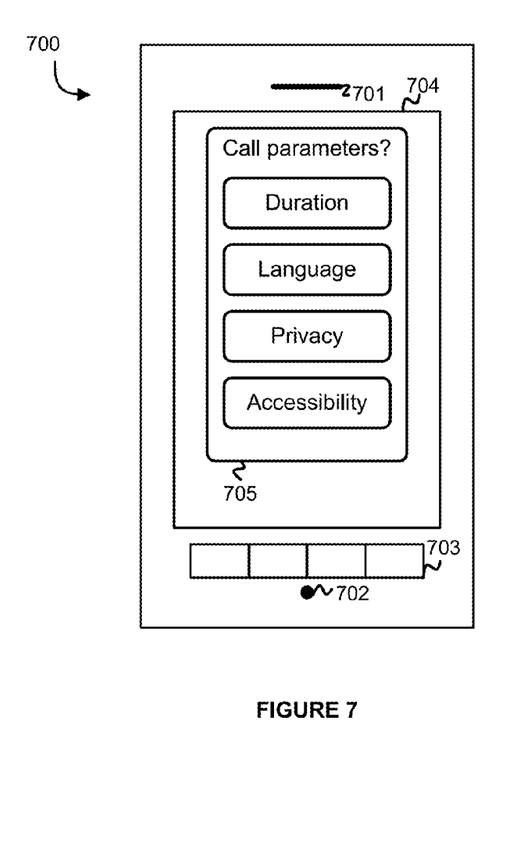
FIG. 7 illustrates a wireless communication device for dynamically guiding a user to a target conversation area with a wireless communication device.

FIG. 7 illustrates wireless communication device 700. Wireless communication device 700 includes speaker 701, microphone 702, buttons 703, and touchscreen display 704. Wireless device 700 may be an example of wireless device 500 for entering call parameters. In this embodiment, display 704 presents parameter menu 705 to a user of wireless device 700. The parameters include call duration, language used on the call, privacy preferences, and accessibility for the target conversation area, however the parameters may include more, less, or different parameters than shown in parameter menu 705. The user of wireless device 700 manipulates parameter menu 705 to select call parameters. The call parameters may be selected after the call request is received so as the parameters are specific to the call, before the call request is received as parameters for a specific call or all calls on the device, or in some combination of before and after the call request is received.

Figure 8:
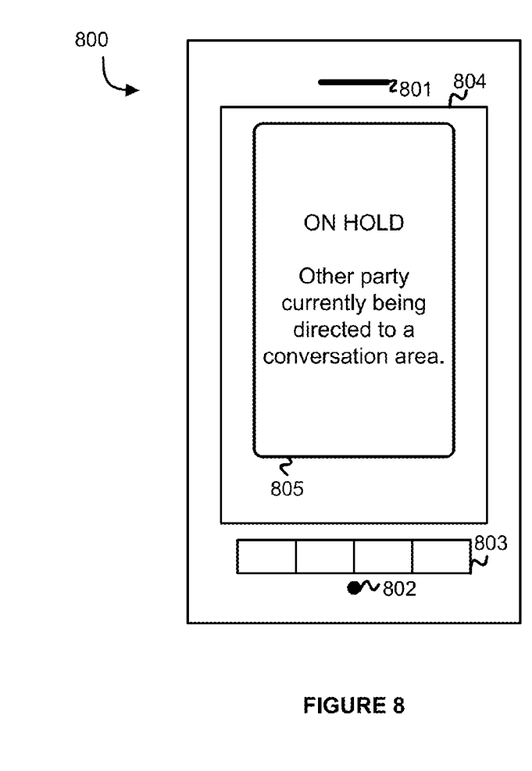
FIG. 8 illustrates a wireless communication device for dynamically guiding a user to a target conversation area with a wireless communication device.

FIG. 8 illustrates wireless communication device 800. Wireless communication device 800 includes speaker 801, microphone 802, buttons 803, and touchscreen display 804. Communication device 800 is an example of communication device 305, however communication device 305 may use alternative configurations. In this example, wireless device 301 places the call on hold while the user is being directed to a target conversation area. Display 804 presents notification box 805 to indicate to a user of communication device 800 that the user of wireless device 301 is being directed to the target conversation area.

Figure 9:
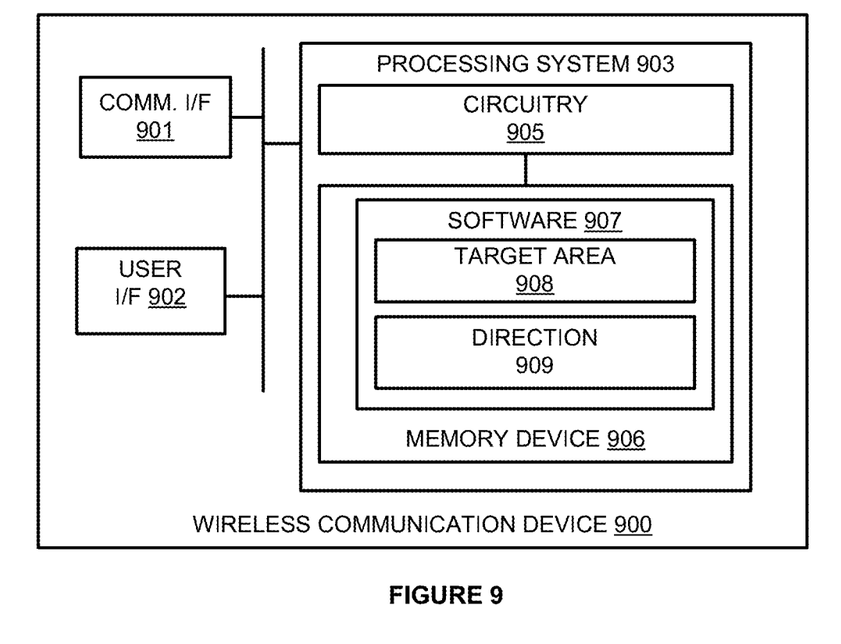
FIG. 9 illustrates a wireless communication device for dynamically guiding a user to a target conversation area with a wireless communication device.

FIG. 9 illustrates wireless communication device 900. Wireless communication device 900 is an example of wireless communication devices 101 and 301, although devices 101 and 301 could use alternative configurations. Wireless communication device 900 comprises wireless communication interface 901, user interface 902, and processing system 903. Processing system 903 is linked to wireless communication interface 901 and user interface 902. Processing system 903 includes processing circuitry 905 and memory device 906 that stores operating software 907. Wireless communication device 900 may include other well-known components such as a battery and enclosure that are not shown for clarity. Wireless communication device 900 may be a telephone, computer, e-book, mobile Internet appliance, media player, game console, wireless network interface card, or some other wireless communication apparatus—including combinations thereof.

Wireless communication interface 901 comprises RF communication circuitry and an antenna. The RF communication circuitry typically includes an amplifier, filter, RF modulator, and signal processing circuitry. Wireless communication interface 901 may also include a memory device, software, processing circuitry, or some other communication device. Wireless communication interface 901 may use various protocols, such as CDMA, EVDO, WIMAX, GSM, LTE, WIFI, HSPA, or some other wireless communication format.

User interface 902 comprises components that interact with a user to receive user inputs and to present media and/or information. User interface 902 may include a speaker, microphone, buttons, lights, display screen, touch screen, touch pad, scroll wheel, communication port, or some other user input/output apparatus—including combinations thereof. User interface 902 may omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Processing circuitry 905 is typically mounted on a circuit board that may also hold memory device 906 and portions of communication interface 901 and user interface 902. Operating software 907 comprises computer programs, firmware, or some other form of machine-readable processing instructions. Operating software 907 includes target area determination module 908 and direction module 909. Operating software 907 may further include an operating system, utilities, drivers, network interfaces, applications, or some other type of software. When executed by processing circuitry 905, operating software 907 directs processing system 903 to operate wireless communication device 900 as described herein.

In particular, operating software 907 directs processing system 903 to receive a call request to establish a call with wireless communication device 900. Target conversation area 908 directs processing system to determine a location of the wireless communication device and determine a target conversation area for a user of wireless communication device 900 to participate in the call based on the location of wireless communication device 900. Direction module 909 directs processing system 903 to direct the user to the target conversation area.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    receiving a call request to establish a call with a communication device;
    determining a location of the communication device;
    determining a target conversation area for a user of the communication device to participate in the call based on the location of the communication device; and
    directing the user to the target conversation area.

2. The method of claim 1, further comprising:
    determining parameters for the call; and
    wherein determining the target conversation area is further based on the parameters for the call.

3. The method of claim 2, wherein determining the target conversation area comprises:
    comparing the parameters for the call and the location of the communication device with characteristics for each target conversation area of a plurality of target conversation areas to determine a compliance of each target conversation area to the parameters for the call and the location of the communication device;
    ranking each target conversation area of the plurality of target conversation areas from most compliant with the parameters and the location for the call to least compliant; and
    selecting the target conversation area based on the ranking for each target conversation area of the plurality of target conversation areas.

4. The method of claim 3, wherein selecting the target conversation area based on the ranking comprises:
    selecting the target conversation area with the most compliant ranking.

5. The method of claim 3, wherein selecting the target conversation area based on the ranking comprises:
    in the communication device, presenting the user with one or more of the target conversation areas with the most compliant rankings;
    receiving a selection from the user indicating the target conversation area from the one or more of the target conversation areas with the most compliant rankings.

6. The method of claim 3, further comprising:
    receiving at least a portion of the parameters for the call from the user.

7. The method of claim 1, further comprising:
    upon determining that the user has reached the target conversation area, updating characteristics for the target conversation area to indicate that the user is occupying the target conversation area for the call.

8. The method of claim 7, further comprising:
    upon completion of the call, updating the characteristics for the target conversation area to indicate that the user is not occupying the target conversation area for the call.

9. The method of claim 1, wherein directing the user to the target conversation area occurs in response to an indication from the user that the user wants to be directed to the target conversation area.

10. The method of claim 1, further comprising:
    placing the call on hold while the user is directed to the target conversation area; and
    notifying other users on the call that the user is being directed to the target conversation area.

11. A communication system, comprising:
- a communication device configured to receive a call request to establish a call with the communication device, determine a location of the communication device, and direct the user to a target conversation area for a user of the communication device to participate in the call; and
- a target conversation area system configured to determine the target conversation area based on the location of the communication device.

12. The communication system of claim 11, further comprising:
- the target conversation area system configured to determine parameters for the call and determine the target conversation area further based on the parameters for the call.

13. The communication system of claim 12, wherein to determine the target conversation area, the target conversation area system is configured to:
- compare the parameters for the call and the location of the communication device with characteristics for each target conversation area of a plurality of target conversation areas to determine a compliance of each target conversation area to the parameters for the call and the location of the communication device;
- rank each target conversation area of the plurality of target conversation areas from most compliant with the parameters and the location for the call to least compliant; and
- select the target conversation area based on the ranking for each target conversation area of the plurality of target conversation areas.

14. The communication system of claim 13, wherein to select the target conversation area based on the ranking, the target conversation area system is configured to select the target conversation area with the most compliant ranking.

15. The communication system of claim 13, wherein to select the target conversation area based on the ranking, the target conversation area system is configured to:
- transfer one or more of the target conversation areas with the most compliant rankings to the communication device, wherein the communication device presents the user with the one or more of the target conversation areas and receives a selection from the user indicating the target conversation area from the one or more of the target conversation areas with the most compliant rankings.

16. The communication system of claim 13, further comprising:
- the communication device configured to receive at least a portion of the parameters for the call from the user.

17. The communication system of claim 11, further comprising:
- the target conversation area system configured to, upon determining that the user has reached the target conversation area, update characteristics for the target conversation area to indicate that the user is occupying the target conversation area for the call.

18. The communication system of claim 17, further comprising:
- the target conversation area system configured to, upon completion of the call, updating the characteristics for the target conversation area to indicate that the user is not occupying the target conversation area for the call.

19. The communication system of claim 11, wherein directing the user to the target conversation area occurs in response to an indication from the user that the user wants to be directed to the target conversation area.

20. The communication system of claim 11, further comprising:
- the communication device configured to place the call on hold while the user is directed to the target conversation area and notify other users on the call that the user is being directed to the target conversation area.

* * * * *